US009333676B2

(12) United States Patent
    Back

(10) Patent No.: US 9,333,676 B2
(45) Date of Patent: May 10, 2016

(54) APPARATUS AND METHOD FOR SUPPLYING POWDER QUANTITATIVELY AND MATERIAL SUPPLYING APPARATUS INCLUDING THE APPARATUS FOR SUPPLYING POWDER

(75) Inventor: Seung Hoon Back, Gwangmyung (KR)

(73) Assignee: Fine Technics Co., Ltd., Gimpo (KR)

( * ) Notice: Subject to any disclaimer, the term of this patent is extended or adjusted under 35 U.S.C. 154(b) by 75 days.

(21) Appl. No.: 11/914,607

(22) PCT Filed: May 17, 2006

(86) PCT No.: PCT/KR2006/001833
    § 371 (c)(1),
    (2), (4) Date: Nov. 16, 2007

(87) PCT Pub. No.: WO2006/126795
    PCT Pub. Date: Nov. 30, 2006

(65) Prior Publication Data
    US 2008/0197525 A1    Aug. 21, 2008

(30) Foreign Application Priority Data

May 23, 2005  (KR) .................. 10-2005-0043208
May 12, 2006  (KR) .................. 10-2006-0042832

(51) Int. Cl.
    *B29C 31/06*   (2006.01)
    *B01F 3/12*    (2006.01)
    *B01F 7/00*    (2006.01)
    *B29B 7/38*    (2006.01)
    *B29B 7/88*    (2006.01)
    (Continued)

(52) U.S. Cl.
    CPC ............. *B29C 31/066* (2013.01); *B01F 3/1221* (2013.01); *B01F 7/00908* (2013.01); *B29B 7/38* (2013.01); *B29B 7/88* (2013.01); *G01F 11/24* (2013.01); *B29K 2105/251* (2013.01)

(58) Field of Classification Search
    CPC .................................................. B29C 31/066
    USPC .................... 264/109; 425/110, 135, 200
    See application file for complete search history.

(56) References Cited

U.S. PATENT DOCUMENTS 5,158,782 A   10/1992  Hayashi et al.
5,747,073 A    5/1998  Pettersson et al.
                (Continued)

FOREIGN PATENT DOCUMENTS

DE    4019032      1/1991
EP    0438661 A2   7/1991
                (Continued)

*Primary Examiner* — Larry Thrower
(74) *Attorney, Agent, or Firm* — Larson & Anderson, LLC (57) ABSTRACT

Provided are an apparatus and method for supplying powder quantitatively and a material supply apparatus including the apparatus for supplying powder quantitatively. The apparatus for supplying powder quantitatively to a place where required includes: a driving part generating a driving force using an external power; a powder supply part connected to the driving part, following the operation of the driving part, and transferring the powder according to a predetermined path; a chamber placed on the sides of the powder supply part and receiving the powder transferred by the powder supply part; a compression part compressing the transferred powder in the chamber; and a quantitative supply part separating a desired amount of powder from the compressed powder and discharging the separated powder from the chamber. The method of supplying powder quantitatively to a place where required includes: a preparation operation of receiving powder and preparing for the transfer of the powder; a powder transfer operation of transferring the powder to a chamber having a predetermined volume according to a predetermined path using a powder supply part that is driven by an external power and transfers the powder; a compressing operation of making the compressed bulk of powder by compressing the transferred powder in a compression part of the chamber; a separating operation of separating a desired amount of powder from the powder that is compressed and bridged in the chamber using a separating means; and a discharge operation of discharging the separated powder to the outside.

12 Claims, 8 Drawing Sheets

(51) Int. Cl.
   *G01F 11/24*    (2006.01)
   *B29K 105/00*   (2006.01)

(56) References Cited

U.S. PATENT DOCUMENTS

| | | | |
|---|---|---|---|
| 5,861,180 | A  | 1/1999 | Kaneko et al. |
| 6,863,429 | B2 | 3/2005 | Torghele et al. |
| 7,927,091 | B2 | 4/2011 | Revol |

FOREIGN PATENT DOCUMENTS

| | | |
|---|---|---|
| JP | 1983-27225   | 8/1983 |
| JP | 1984-71219   | 5/1984 |
| JP | 1990-135821  | 11/1990 |
| JP | 11-180564    | 7/1999 |
| JP | 2000-211745  | 8/2000 |
| JP | 2000-301391  | 10/2000 |
| JP | 2001-72250   | 3/2001 |
| KR | 2001-77603   | 8/2001 |

APPARATUS AND METHOD FOR SUPPLYING POWDER QUANTITATIVELY AND MATERIAL SUPPLYING APPARATUS INCLUDING THE APPARATUS FOR SUPPLYING POWDER

CROSS-REFERENCE TO RELATED PATENT APPLICATIONS

This application claims the benefit of Korean Patent Application Nos. 10-2005-0043208 and 10-2006-0042832, filed on May 23, 2005 and May 12, 2006, in the Korean Intellectual Property Office, the disclosure of which are incorporated herein in their entirety by reference.

BACKGROUND OF THE INVENTION

1. Field of the Invention

The present invention relates to an apparatus and method for supplying powder quantitatively and a material supplying apparatus including the apparatus for supplying powder quantitatively.

2. Description of the Related Art

Plastic goods having a desired color or special function can be produced by using additives having the desired color or special function in plastic materials (e.g., LDPE, EVA, PP, PET, PC, PVC, etc.) while molding the plastic materials using a process of extrusion or injection.

However, since additives are mostly powder or liquid, it is technically difficult to uniformly mix them with the plastic materials and thus the plastic materials have a different distribution density, making the color of the plastic goods bridged or spotted. Therefore, it is very difficult to produce plastic goods having the desired color or special function.

To uniformly mix powder with the plastic materials, the plastic materials are previously coated with a required amount of powder, the powder and the plastic materials are fused by melting them together, or concentrated powder is provided to the plastic materials using a carrier, etc. However, since it is necessary to separately measure or transfer the powder, the plastic goods have a very low productivity, and the measured amount of powder is different from the used amount of powder, causing the plastic goods to be of low quality.

To solve the problem of the conventional methods, a gravimetric quantitative feeding method using a microbalance or a volumetric quantitative feeding method using a micro-screw have been suggested. However, since these two methods cannot prevent the powder from bridging, generating static electricity, and flying into air due to the measurement or transfer of the powder, it is difficult to supply powder quantitatively.

SUMMARY OF THE INVENTION

The present invention provides an apparatus and method for supplying powder quantitatively that does not prevent powder from being bridged but derives bridging property in order to avoid an ununiform supply of quantitative powder due to a partial change in the bulk density of the powder caused by an external factor such as pressure, moisture, static electricity or the like which is applied to the powder being held or transferred, compresses the powder completely thereby uniforming bulk density of the transferred powder, and measures a predetermined volume of the powder by precisely separating a necessary amount of the powder from the compressed powder, thereby precisely controlling the amount of supplied powder, and a material supply apparatus that mixes the powder provided by the apparatus for supplying powder quantitatively and a plastic material effectively.

According to an aspect of the present invention, there is provided an apparatus for supplying powder quantitatively to a place where required, the apparatus comprising: a driving part generating a driving force using an external power; a powder supply part connected to the driving part, following the operation of the driving part, and transferring the powder according to a predetermined path; a chamber placed on the sides of the powder supply part and receiving the powder transferred by the powder supply part; a compression part compressing the transferred powder in the chamber; and a quantitative supply part separating a desired amount of powder from the compressed powder and discharging the separated powder from the chamber.

The driving part may comprise a gear box comprising: a plurality of gears receiving a rotational torque from outside and rotating at a predetermined speed ratio; and a plurality of rotation shafts fixed to the gears and rotating about their axes by the rotation of the gears, and extending in a longitudinal direction.

The powder supply part may comprise: an upper plate fixed outside of the gear box and through which one or more than one rotation shafts of the plurality of rotation shafts passes; and a powder pushing unit equipped on the upper plate, rotating clockwise or counterclockwise in contact with the upper surface of the upper plate by the rotation shafts, and transferring the powder to the chamber.

The chamber may comprise a sub-supply block comprising: a first space part with a predetermined diameter and depth opened toward the powder supply part to receive the powder provided by the powder supply part, and through which one of the rotation shafts of the gear box passes upward and is disposed in the center thereof; and a second space part with a predetermined diameter and depth formed at the sides of the first space part, opened to the first space part to receive the powder from the first space part, and through which another rotation shaft of the gear box passes upward and is disposed in the center thereof.

The compression part may comprise: at least one feeding gear placed inside the first space part and rotating by the rotation shafts and having a plurality of gear teeth transferring the powder provided by the powder supply part to the second space part; a transfer disk placed inside the second space part and rotating by the rotation shafts, and having a circular arc powder pressing groove, and receiving the compressed powder transferred through the feeding gear; and a cover main body placed on the transfer disk, partly covering the powder pressing groove, and supporting the powder to the powder pressing groove.

The quantitative supply part may comprise a blade having a leading end part entering into the powder pressing groove, partly cutting the compressed powder in the powder pressing groove during the rotation of the transfer disk, and discharging the cut powder from the second space part.

The apparatus may further comprise: a crushing pin fixed in the cover main body and crushing the compressed bulk of powder while the bridged powder is being transferred and compressed by the feeding gear, and transferring the crushed powder to the powder pressing groove.

The transfer disk may comprise: an inner disk having a predetermined diameter and rotating by the rotation shaft; an outside ring having the same axis as the inner disk, and the inner circumference spaced apart from the exterior circumference of the inner disk forming the powder pressing groove; and a packing member inserted into the lower part of the powder pressing groove and upwardly supporting the powder stored in the powder pressing groove.

A projection is formed at the bottom part of the second space part to press the powder approaching the blade to the cover main body by moving the packing member of the transfer disk upward.

The apparatus may further comprise: a powder storing case attached to the upper part of the upper plate and storing powder to be provided from outside in which the upper part acts as a bottom surface, wherein the powder pushing unit comprises; a fixing unit fixed to the rotation shaft and being symmetrical around the rotation shaft; a tip unit placed in both ends of the fixing unit and moving in a length direction of the fixing unit; and a spring disposed between the fixing unit and the tip unit and elastically supporting the tip from the fixing unit to externally, wherein two or more projections temporally compressing the tip unit of the pushing unit to the fixing unit during the rotation of the pushing unit are formed in the inner circumference of the powder storing case.

The apparatus may further comprise: a porous plate spaced parallel apart from the upper plate in the inner surface of the powder storing case and having a plurality of through holes passing downward the powder provided from outside; and an auxiliary rotor placed on the upper surface of the porous plate, rotating by the rotation shaft, and inducing the powder to the through holes.

According to another aspect of the present invention, there is provided a material supply apparatus comprising: an upper duct passing an externally provided plastic raw material having a quantitative powder supply device that discharges powder to be mixed with the plastic raw material; a rotation duct rotatably equipped at the lower part of the upper duct and including a stirring unit mixing the plastic raw material with the powder; a lower duct placed below the lower part of the rotation duct, rotatably supporting the rotation duct, and discharging a mixture of the plastic raw material and powder downwardly that passes through the rotation duct to the outside; bearings disposed between the upper duct and the rotation duct and between the lower duct and the rotation duct, rotatably supporting the rotation duct, and forming a seal between the rotation duct and the upper and lower ducts; and a driving unit axis-rotating the rotation duct and operating the stirring unit.

The stirring unit may be at least one steel wire fixed in the inner circumference of the rotation duct.

According to another aspect of the present invention, there is provided a method of supplying powder quantitatively to a place where required, the method comprising: a preparation operation of receiving powder and preparing for the transfer of the powder; a powder transfer operation of transferring the powder to a chamber having a predetermined volume according to a predetermined path using a powder supply part that is driven by an external power and transfers the powder; a compressing operation of compressing the transferred powder in a compression part of the chamber; a separating operation of separating a desired amount of powder from the powder that is compressed and bridged in the chamber using a separating means; and a discharge operation of discharging the separated powder to the outside.

The power supply part may comprise: a plurality of gears receiving a rotational torque from outside and rotating at a predetermined speed ratio; and a rotor rotating by the rotational power of the gears and transferring the powder, wherein, in the powder transfer operation, the powder is transferred to the chamber using the rotor.

The compression part performing the compressing operation may comprise a pressing tool pressing the powder, and a compression frame storing the powder and transferring pressure to the powder, wherein, in the compressing operation, the powder transferred through the powder transfer operation is compressed by the operation of the compression part.

In the separating operation, the separating means may be used to volume-separate the powder from the compressed powder by entering a blade in a relative motion with regard to the powder into the compressed powder in chamber to a predetermined depth.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings.

Figure 1:
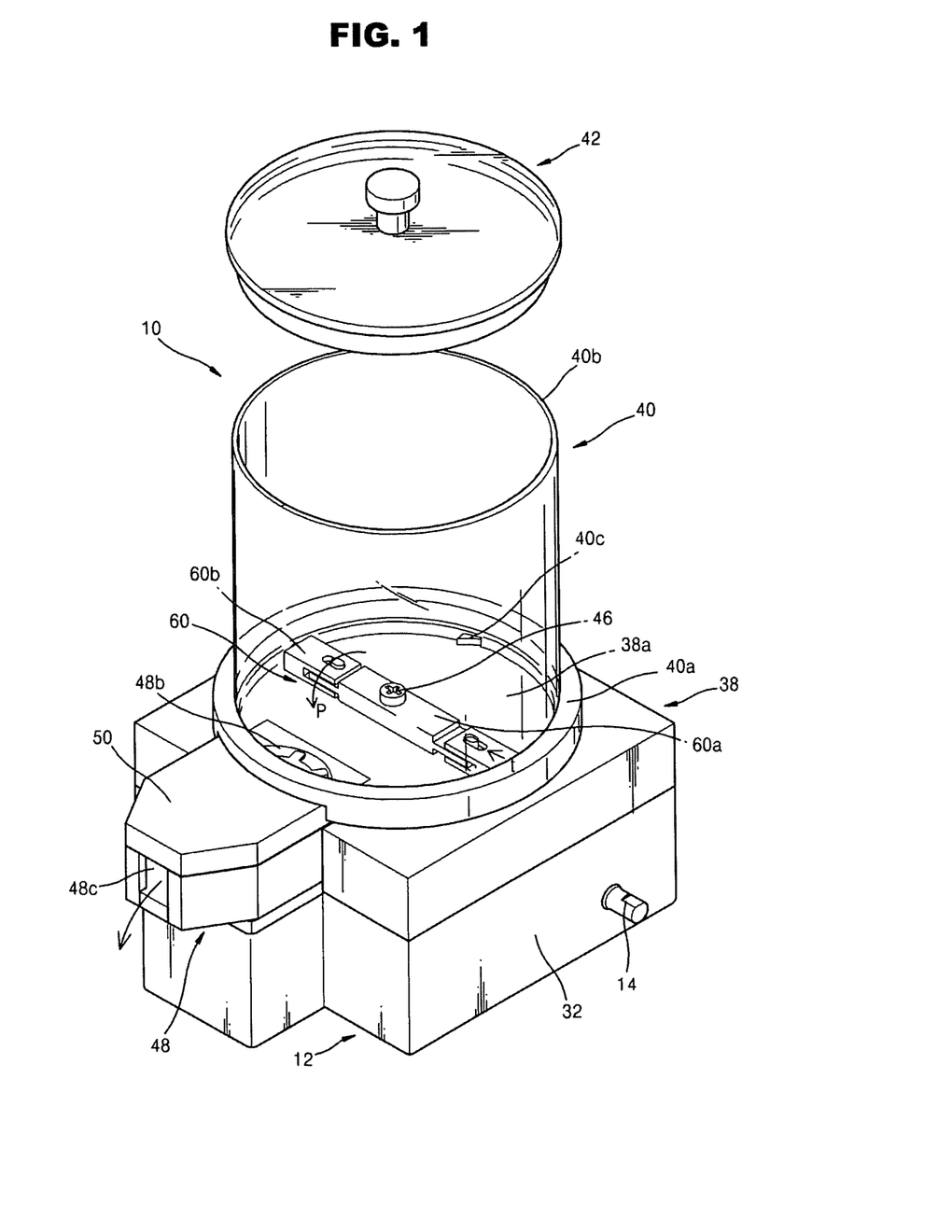
FIG. 1 is a perspective view of an apparatus for supplying powder quantitatively according to an embodiment of the present invention.

FIG. 1 is a perspective view of an apparatus 10 for supplying powder quantitatively according to an embodiment of the present invention. Referring to FIG. 1, the apparatus 10 for supplying powder quantitatively comprises a gear box 12 receiving a rotating torque from outside and including three shafts (30, 34, and 36 illustrated in FIG. 2) on the upper portion thereof, an upper plate 38 and a quantitative supply part 48 placed on the upper part of the gear box 12, a powder storing case 40 attached to the upper part of the upper plate 38 and storing powder to be provided, a rotor 60 rotating inside the powder storing case 40 and supplying the powder to the quantitative supply part 48, and a compression plate 50 sealing the upper part of the quantitative supply part 48.

Figure 3:
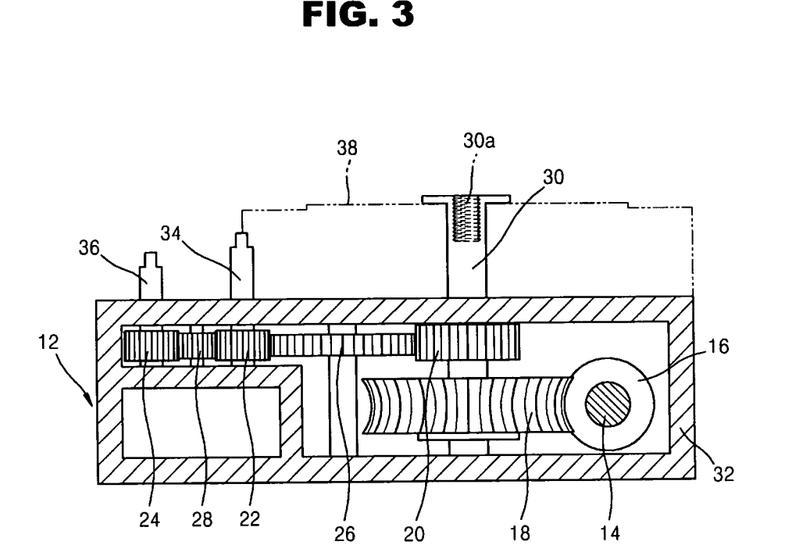
FIG. 3 is a side cross-sectional view of a gearbox included in the apparatus for supplying powder quantitatively illustrated in FIG. 1.

The gear box 12 rotates the three shafts 30, 34, and 36 in the same direction and at a predetermined speed ratio. The gear box 12 will now be described with reference to FIG. 3. FIG. 3 is a side cross-sectional view of the gearbox 12 included in the apparatus for supplying the quantitative powder illustrated in FIG. 1. Referring to FIG. 3, the gear box 12 comprises a casing 32 enclosing an inner space of the gear box 12, a worm 16 horizontally installed inside the casing 32 and rotates by the torque received from a motor (not shown) outside through a driving shaft 14, a worm gear 18 engaged with the worm 16, a first gear 20 fixed into the upper part of the worm gear 18, and the first shaft 30 receiving the rotating torque from the first gear 20, extending upward to the upper part of the casing 32, and passing through the upper plate 38.

The gear box 12 further comprises a first middle gear 26, a second gear 22, a second middle gear 28, and a third gear 24 next to the first gear 20. The second gear 22 and the third gear 24 have the same size and thus are identical to each other in terms of rotating speed and direction. The first gear 20 and the second gear 22 can have a gear ratio between 3:1 and 4:1.

The second shaft 34 is fixed in the rotation center of the second gear 22, and the third shaft 36 is fixed in the rotation center of the third gear 24. The second shaft 34 and the third shaft 36 extend to the upper part of the casing 32 and are parallel to each other.

Figure 2:
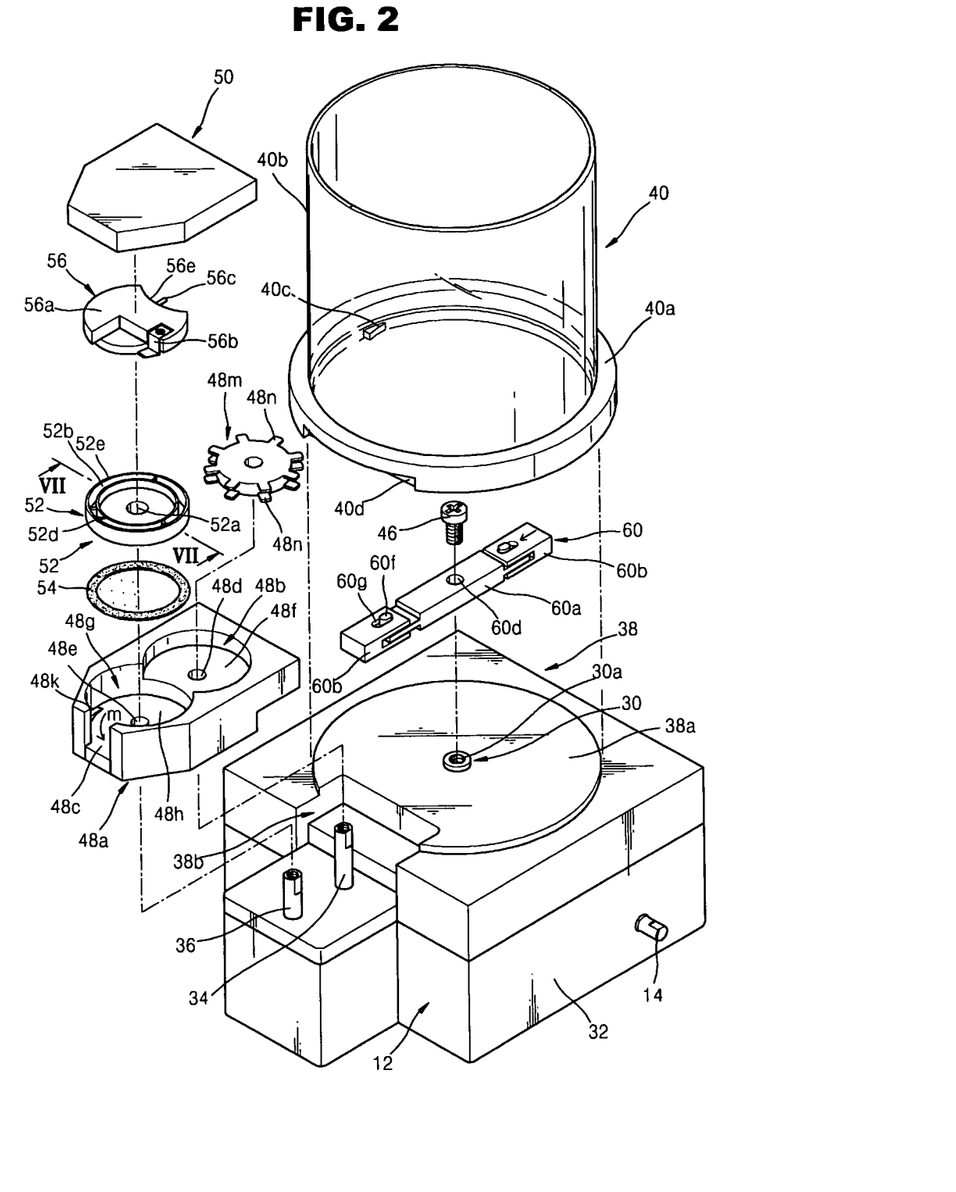
FIG. 2 is an exploded perspective view of the apparatus for supplying powder quantitatively illustrated in FIG. 1.

The first shaft 30 rotates a rotor 60, and the second shaft 34 rotates a feeding gear (48m illustrated in FIG. 2.), and the third shaft 36 rotates a transfer disk (52 illustrated in FIG. 2).

Referring to FIG. 1, the upper plate 38 placed on the upper part of the gear box 12 is a metal block providing a flat surface on which the powder storing case 40 is attached. The upper surface of the upper plate 38 and the lower part of the powder storing case 40 are connected to each other so that powder does not leak out.

A support plane (38a illustrated in FIG. 2) with a predetermined diameter is projected from the upper center of the upper plate 38. The support plane 38a acts as a bottom surface of the powder storing case 40. The rotor 44 goes over the support plane 38a.

The powder storing case 40 comprises a sealing ring 40a tightly attached to the upper plate 38 and including the support plane 38a, a cylindrical case body 40b fixed to the sealing ring 40a and extending to the upper part thereof, and a cap 42 covering the case body 40b and sealing the case 40. The case body 40b and the cap 42 can be formed of a transparent acryl.

The sealing ring 40a includes a projection 40c in its inner circumference. The end parts of the rotor 60 that rotates in a direction p cross over the projection 40c having an incline surface (40e illustrated in FIG. 4). The incline surface 40e moves elastic tips 60b that are end parts of the rotor 60 in a direction t. If the elastic tips 60b move in the direction t, a spring (60h illustrated in FIG. 5) disposed between the elastic tips 60b and a fixing rod 60a is compressed.

Therefore, when the end parts of the rotor 60 cross over the projection 40c, the elastic tips 60b instantly moves in an opposite direction of the direction t from the fixing rod 60a via an elastic restoration force, causing a shock. This will be in detail described with reference to FIG. 5. Powder on the rotor 60 is separated from the rotor 60 due to the shock generated when the rotor 60 crosses over the projection 40c.

The quantitative supply part 48 receives powder through a first space 48b which is partially included in the inner space of the powder storing case 40, compresses the powder, separates a desired amount of the powder from the compressed powder using a blade (56b illustrated in FIG. 2), and discharges the desired amount of the power to an outlet 48c.

The compression plate 50 covers the quantitative supply part 48, presses a disk cover (56 illustrated in FIG. 2), and simultaneously seals the inner space of the quantitative supply part 48 to prevent external impurities from entering into the quantitative supply part 48.

FIG. 2 is an exploded perspective view of the apparatus for supplying the quantitative powder illustrated in FIG. 1. Referring to FIG. 2, the first, second, and third shafts 30, 34, and 36 extend upward from the gear box 12. The first shaft 30 passes through the upper part of the upper plate 38 and is located at the center of the support plane 38a.

A storing groove 38b that stores a part of the quantitative supply part 48 is formed in a portion of the support plane 38a. The storing groove 38b is a stepped groove and enters into the support plane 38a.

The maximum length of the rotor 60 is the same as the diameter of the support plane 38a. This means that the storing groove 38b is partly included in a rotation radius of the rotor 60 so that the powder transferred by the rotor 60 can be supplied to the quantitative supply part 48 under the powder storing case 40.

The rotor 60 is coupled to the first shaft 30 via a bolt 46 and rotates on the support plane 38a. The bottom surface of the rotor 60 faces the upper surface of the support plane 38a. At this time, the powder between the rotor 60 and the support plane 38a acts as a lubricant. A female screw hole 30a coupled with the bolt 46 is formed on the upper end part of the first shaft 30. Therefore, if necessary, the rotor 60 can be easily separated from the first shaft 30. A leading end part of the compression plate 50 is inserted into a compressed plate inserting groove 40d.

The quantitative supply part 48 comprises a sub-supply block 48a partly inserted into the storing groove 38b, formed on the upper part of the gear box 12, and includes first and second space parts 48b and 48g on the upper part thereof, the feeding gear 48m screwed into the first space part 48b, the transfer disk 52 rotatably placed in the second space part 48g, and the disk cover 56 fixed to the upper part of the transfer disk 52 and downwardly supporting the transfer disk 52.

The upper surface of the sub-supply block 48a is flat and tightly faces the bottom surface of the compression plate 50.

The first space part 48b is a circular groove with a predetermined diameter and depth and has a through hole 48d in the center of the bottom surface 48f. The through hole 48d vertically perforates the sub-supply block 48a and passes through the upper part of the second shaft 34. The second shaft 34 is coupled to the feeding gear 48m inside the first space part 48b and rotates the feeding gear 48m in a direction.

The feeding gear 48m has a plurality of gear teeth 48n at a regular interval in its outer circumference. In particular, the gear teeth 48n are divided into up and down in order to rotate the feeding gear 48m by entering a crushing pin 56c into the gear teeth 48n as described in FIG. 9.

The feeding gear 48m operates like a gear pump, receives the powder provided by the rotor 60 to the first space part 48b, and moves the powder to the second space part 48g, which will be described in detail with reference to FIG. 8. The powder is compressed and bridged while being transferred by the feeding gear 48m.

The second space part 48g is a circular groove having a predetermined diameter and is deeper than that of the first space part 48b. In the current embodiment, the inner diameter of the second space part 48g is identical to that of the first space part 48b, but the present invention is not necessarily restricted thereto.

The second space part 48g is simultaneously opened upwardly toward the first space part 48b in order to receive the powder through the first space part 48b.

A through hole 48e is formed in the center of the bottom surface 48h of the second space part 48g. The through hole 48e is vertically formed in the sub-supply bock 48a and is passed through by the upper part of the third shaft 36. The third shaft 36 is inserted into the transfer disk 52 to rotate the transfer disk 52. The transfer disk 52 and the feeding gear 48m are identical to each other in terms of rotational speed and direction.

A projection 48k is formed in the sides of the through hole 48e. The projection 48k is formed on the bottom surface of the second space part 48g closer to a wall, and pushes a packing ring 54, which rotates in a direction m, of the lower part of the transfer disk 52 in a direction f (illustrated in FIG. 9).

The transfer disk 52 comprises an inner disk 52d having a predetermined diameter and including a shaft insertion hole 52a into which the third shaft 36 is inserted, an outside ring 52e surrounding an inner disk and forming a powder pressing groove 52b having a predetermined width with the inner disk 52d, and the packing ring 54 inserted into the powder pressing groove 52b at the lower part of the transfer disk 52.

The packing ring 54 packs the lower part of the powder pressing groove 52b to prevent powder pressed in the powder pressing groove 52b from leaking and upwardly press the powder against the disk cover 56 after being pushed upwardly by the projection 48k. The powder pressing groove 52b stores the powder supplied by the feeding gear 48m and forms a circular arc having a predetermined width.

The disk cover 56 is formed of a Teflon resin having a predetermined thickness and covers a part of the powder pressing groove 52b using the bottom surface thereof. The disk cover 56 comprises a cover body 56a inserted into the second space part 48g and downwardly supporting the transfer disk 52, the crushing pin 56c fixed on a portion of the cover body 56a, and the blade 56b fixed at the opposite side of the cover body 56a to the crushing pin 56c.

A circular arc-shaped groove 56e is formed at the outer circumference of the cover body 56a toward the feeding gear 48m. The circular arc-shaped groove 56e has the same curvature as the outer circumference of the feeding gear 48m and opens the powder pressing groove 52b upwardly as illustrated in FIG. 8.

The crushing pin 56c is fixed into the circular arc-shaped groove 56e. The crushing pin 56c, which is an iron core extending toward between the gear teeth 48n, crushes (bridged) compressed powder between the gear teeth 48n so that the powder pressing groove 52b can easily accommodate the crushed powder.

The blade 56b is fixed in the opposite side of the cover body 56a to the crushing pin 56c. The leading end portion of the blade 56b fixed into the cover main body 56a extends inside the powder pressing groove 52b. The maximum length of the blade 56b that enters into the powder pressing groove 52b can be controlled according to circumstances and is in a range of about 1 mm to 3 mm.

The compression plate 50 is put on the upper part of the sub-supply block 48a after the feeding gear 48m, the transfer disk 52, and the disk cover 56 are installed in the first and second space parts 48b and 48g. The compression plate 50 supports the disk cover 56 and the feeding gear 48m and simultaneously seals a part of the first space part 48b and the second space part 48g. The compression plate 50 can be coupled to the sub-supply block 48a using any coupling methods.

FIG. 3 is a side cross-sectional view of the gearbox 12 included in the apparatus for supplying the quantitative powder 10 illustrated in FIG. 1.

Figure 4:
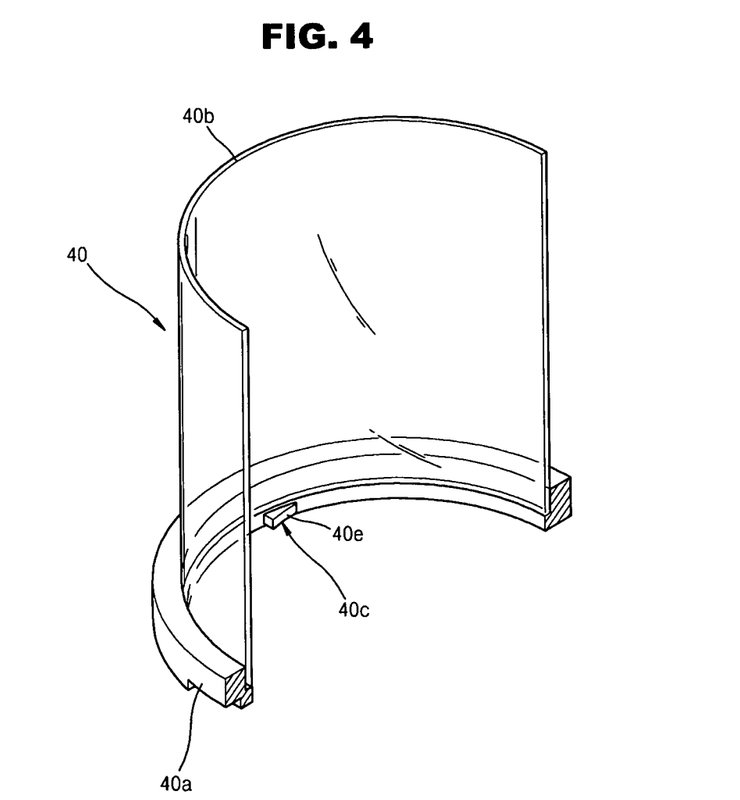
FIG. 4 is a cross-sectional perspective view of a powder storing case illustrated in FIG. 1.

FIG. 4 is a cross-sectional perspective view of the powder storing case 40 illustrated in FIG. 1. Referring to FIG. 4, the powder storing case 40 comprises the sealing ring 40a that is tightly attached to the upper plate 38, and the case body 40b of which a lower part is connected to the sealing ring 40a and extends upwardly. The projection 40c is formed in the inner circumference of the sealing ring 40a. The number of the projection 40c can be changed according to circumstances.

Figure 5:
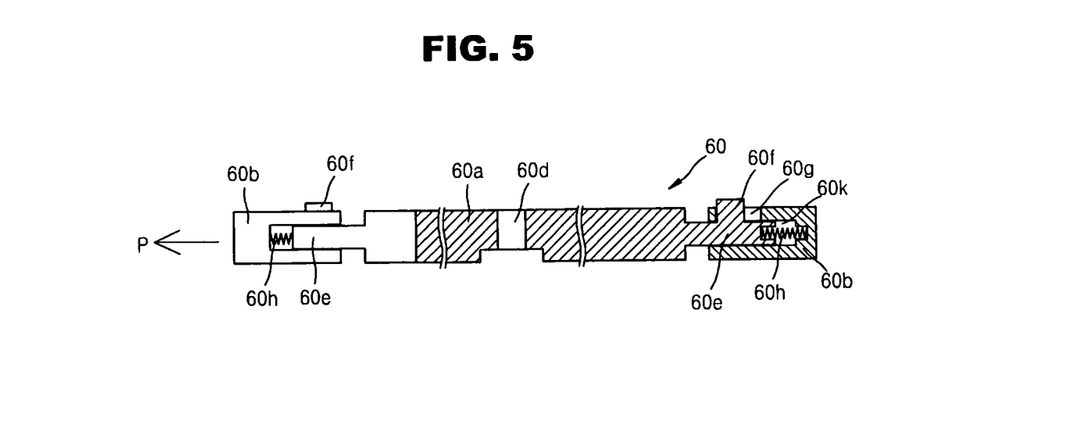
FIG. 5 is a partial cross-sectional view of a rotor illustrated in FIG. 2.

FIG. 5 is a partial cross-sectional view of the rotor 60 illustrated in FIG. 2. Referring to FIG. 5, the rotor 60 comprises the fixing rod 60a including the through hole 60d through which the bolt 46 passes downward in the center thereof and fixed to the first shaft 30, the elastic tips 60b place in both ends of the fixing rod 60a, and the spring 60h disposed between the fixing rod 60a and the elastic tips 60b and supporting the elastic tips 60b in the direction p.

An insertion end part 60e that is thin and integrally formed with a guide pin 60f in the upper surface thereof is disposed at both ends of the fixing rod 60a. The insertion end part 60e has a predetermined thickness and is inserted into a storing part 60k of the elastic tips 60b. The guide pin 60f is a projection having a long oval cross-section in the length direction of the rotor 60.

The elastic tips 60b stores the insertion end part 60e and is supported by the spring 60h in the direction p. A long hole 60g through which the guide pin 60f is inserted is formed in the elastic tips 60b. The long hole 60g stores the guide pin 60f and guides the elastic tips 60b to move in the length direction.

When the rotor 60 having the above structure rotates, the elastic tips 60b cross over the incline surface 40e of the projection 40c and is compressed in the opposite direction of p. When the elastic tips 60b pass through the projection 40c, the elastic tips 60b springs out in the direction p by the operation of the spring 60h so that the guide pin 60f collides with the inner circumference of the long hole 60g, generating a shock. The shock detaches the powder from the rotor 60.

Figure 6:
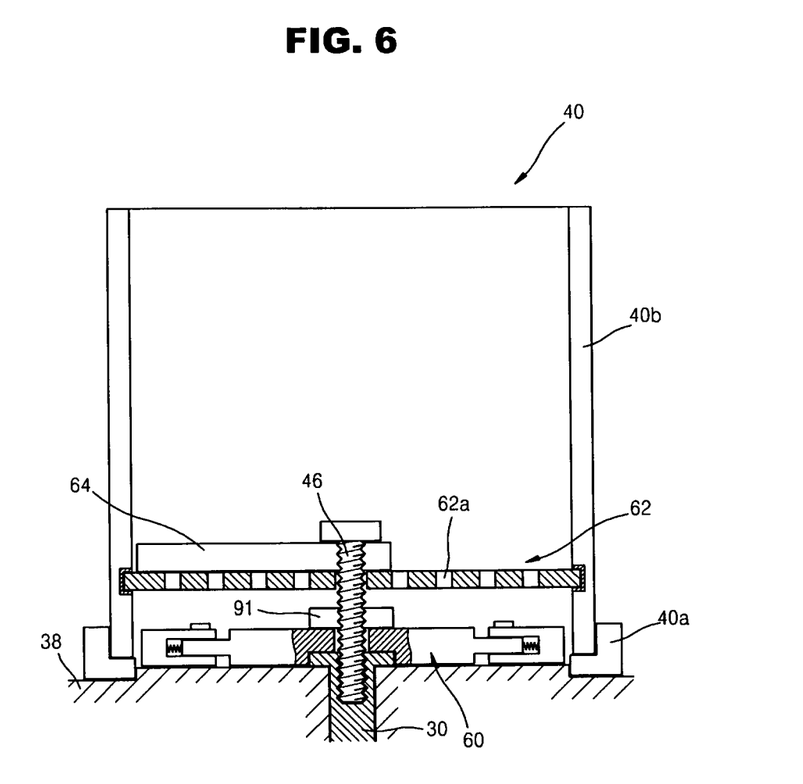
FIG. 6 is a cross-sectional view of a powder storing case applied to the apparatus for supplying powder quantitatively according to another embodiment of the present invention.

FIG. 6 is a cross-sectional view of a powder storing case applied to the apparatus for supplying quantitative powder according to another embodiment of the present invention. Referring to FIG. 6, the case body 40b comprises a porous plate 62 and an auxiliary rotor 64. The porous plate 62 is a disk type constituent having a plurality of through holes 62a and is horizontally fixed to the upper part of the rotor 60.

The auxiliary rotor 64 is placed on the upper surface of the porous plate 62, is fixed via the bolt 46, and rotates with the rotor 60. The porous plate 62 bears the weight of powder provided from outside to prevent the rotor 60 from being pressed by the weight of the powder. The auxiliary rotor 64 is used to drop the powder at a uniform distribution through the through holes 62a of the porous plate 62.

A nut 91 fixes the rotor 60 into the first shaft 30.

Figure 7:
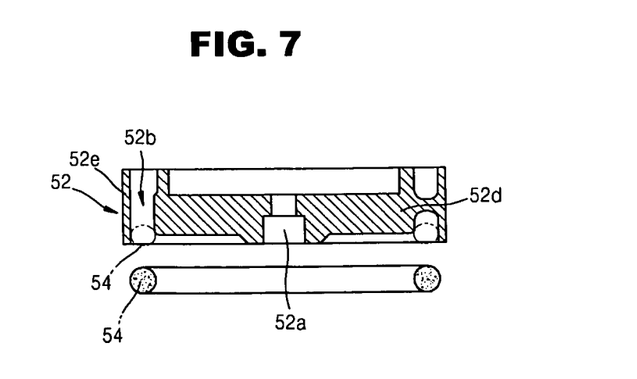
FIG. 7 is a cross-sectional view of a transfer disk taken along a line VII-VII illustrated in FIG. 2.

FIG. 7 is a cross-sectional view of the transfer disk 52 taken along a line VII-VII illustrated in FIG. 2. Referring to FIG. 7, the powder pressing groove 52b having a predetermined width is disposed between the inner disk 52d and the outside ring 52e. The packing ring 54 is inserted into the lower part of the powder pressing groove 52b to seal the lower part of the powder pressing groove 52b.

Figure 8:
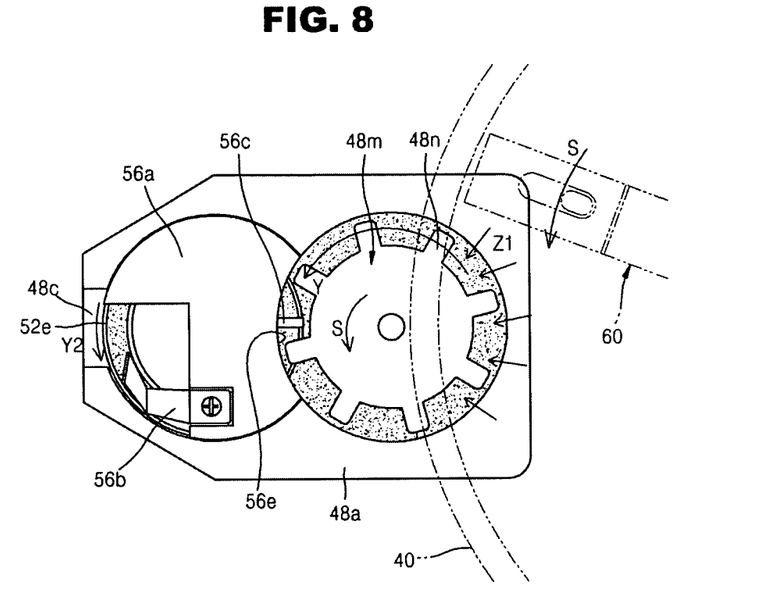
FIGS. 8 and 9 are plan views for illustrating an operating mechanism of the apparatus for supplying powder quantitatively according to an embodiment of the present invention.
Figure 9:
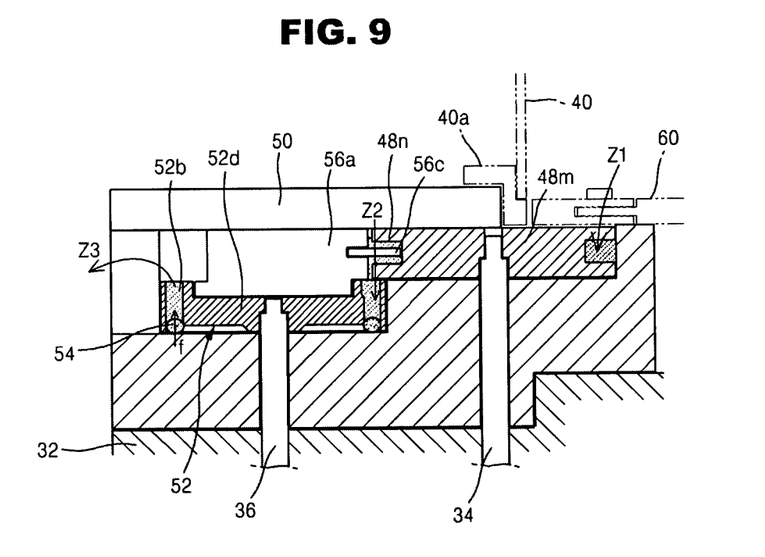

FIGS. 8 and 9 are plan views for illustrating an operating mechanism of the apparatus 10 for supplying powder quantitatively according to an embodiment of the present invention. Referring to FIGS. 8 and 9, the feeding gear 48m is mounted in the first space part 48b of the sub-supply block 48a, and the transfer disk 52 and the disk cover 56 are mounted above and below in the second space part 48g. The feeding gear 48m and the transfer disk 52 rotate in the direction s.

As indicated by a dotted line, a part of the first space part 48b is included in the powder storing case 40. Therefore, powder is pushed into the first space part 48b in the direction z1 by the rotor 60 rotating in the direction s.

The powder pushed into the first space part 48b is stored between the gear teeth 48n of the feeding gear 48m, moves in the direction Y by the continuous rotation of the feeding gear 48*m*, and is compressed between the inner circumference of the first space part 48*b*. The powder moved in the direction Y enters into the lower part of the compression plate 50 so that the powder is separated from outside and is not blown away.

The powder that is transferred in the direction Y by the feeding gear 48*m* and is compressed by the compression plate 50 is crushed by the crushing pin 56*c*. Since the powder transferred by the feeding gear 48*m* is compressed and bridged between the gear teeth 48*n*, the powder can move inside the powder pressing groove 52*b* (in the direction z2) after being crushed by the crushing pin 56*c*.

The powder crushed by the crushing pin 56*c* moves inside the powder pressing groove 52*b* of the transfer disk 52 that rotates, and fills up the powder pressing groove 52*b*. Since the powder pressing groove 52*b* and the gear teeth 48*n* of the upper part of the powder pressing groove 52*b* cross each other, the powder is pressed by the gear teeth 48*n* and pressed in the powder pressing groove 52*b*.

The powder that filled up the powder pressing groove 52*b* is compressed again the bottom surface of the cover main body 56*a*, and moves to the blade 56*b* in the direction Y2. The powder of the powder pressing groove 52*b* is pressed by the bottom surface of the cover body 56*a* to flatten the upper surface thereof.

In particular, the projection 48*k* formed on the bottom surface of the second space part 48*g* pushes up the packing ring 54 in the direction f so that the powder is strongly pressed upwardly and is relatively compressed by the bottom surface of the cover body 56*a*.

The blade 56*b* cuts off the upper part of the powder that has arrived at the leading end part of the blade 56*b* so that the cut powder is discharged through the outlet 48*c* in the direction z3. The amount of discharged powder can be changed by the length of the leading end part of the blade 56*b* that enters into the powder pressing groove 52*b* or the rotational speed of the transfer disk 52.

The powder passing below the blade 56*b* moves to the feeding gear 48*m* again and is mixed with newly provided powder.

Figure 10:
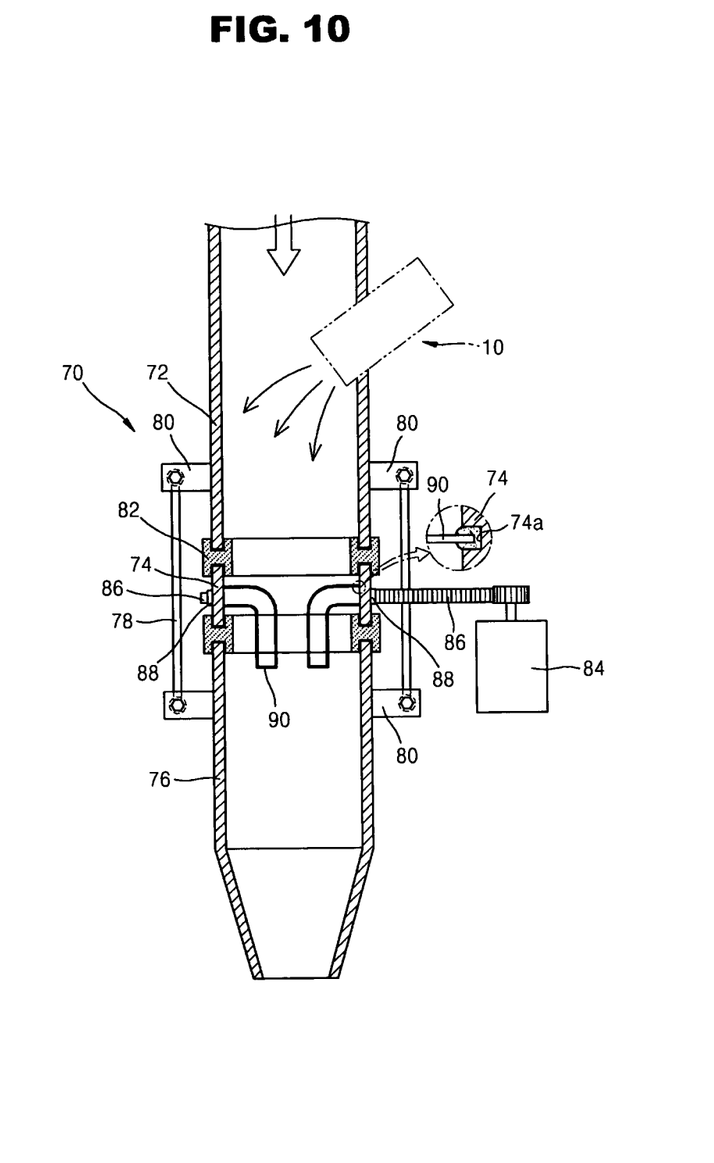
FIG. 10 is a cross-sectional view of a material supply apparatus according to an embodiment of the present invention.

FIG. 10 is a cross-sectional view of a material supply apparatus 70 according to an embodiment of the present invention. The material is a mixture of plastic raw materials and powder.

Referring to FIG. 10, the material supply apparatus 70 comprises a pipe type upper duct 72 fixing the apparatus 10 for supplying quantitative powder in an inclined condition, a rotation duct 74 placed at the lower part of the upper duct 72, a lower duct 76 placed at the lower part of the rotation duct 74, rotatably supporting the rotation duct 74 and downwardly transferring the material, a motor 84 rotating the rotation duct 74. The upper duct 72 is a pipe having a predetermined diameter and downwardly transfers plastic raw material through a separately attached hopper (not shown). The plastic raw material falls down with the quantitative powder discharged by the apparatus 10 for supplying the quantitative powder while being transferred downward.

The rotation duct 74 is a pipe having the same size as the upper duct 72 and includes a stirring steel wire 90. The stirring steel wire 90 is a linear constituent that mixes the plastic raw material with the powder. The stirring steel wire 90 is fixed to the rotation duct 74 by inserting both ends of the stirring steel wire 90 into a groove 74*a* formed in the inner circumference of the rotation duct 74 and welded with the rotation duct 74. The formation or number of the stirring steel wheel 90 can be changed according to circumstances. Another stirring constituent can replace the stirring steel wire 90.

The material supply apparatus 70 further comprises a sprocket 88, a motor 84, and a chain 86 to axis-rotate the rotation duct 74. The sprocket 88 surrounds the outer circumference of the rotation duct 74 and is coupled to a driving axis of the motor 84 using the chain 86. Therefore, if the motor 84 is operated, a driving force of the motor 84 is transmitted to the sprocket 88 using the chain 86 and the rotation duct 74 axis-rotates so that the material is stirred.

Teflon bearings 82 are placed between the upper duct 72 and the rotation duct 74 and between the rotation duct 74 and the lower duct 76. The Teflon bearings 82 are formed of conventional Teflon and are used to rotate the rotation duct 74 between the upper duct 72 and the lower duct 76. The Teflon bearings 82 block the inner space of the ducts 72, 74, and 76 from outside.

Supporting rods 78 and brackets 80 are used to maintain an interval between the upper duct 72 and the lower duct 76. The brackets 80 are iron pieces fixed to the outer circumference of the upper duct 72 and the lower duct 76.

The supporting rods 78 interconnect the brackets 80 of the upper duct 72 and the lower duct 76. The upper and lower end parts of the supporting rods 78 are coupled to the brackets 80 of the upper duct 72 and the lower duct 76, respectively, to firmly maintain the interval between the upper duct 72 and the lower duct 76, which are spaced a predetermined distance from rotation duct 74.

Figure 11:
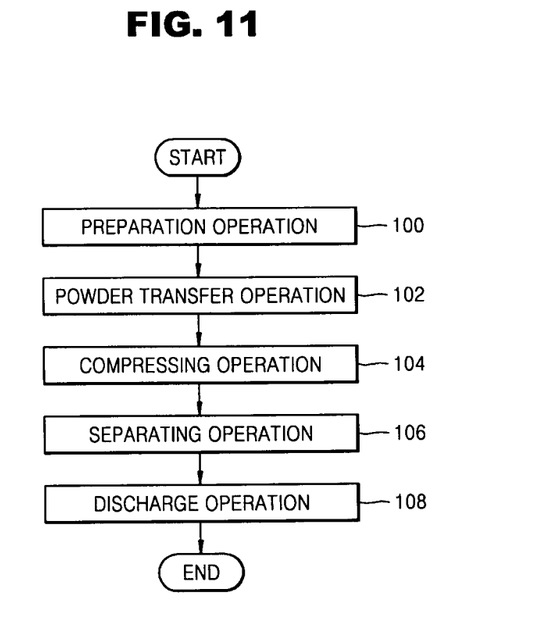
FIG. 11 is a flowchart illustrating a method of supplying powder quantitatively according to an embodiment of the present invention.

FIG. 11 is a flowchart illustrating a method of supplying powder quantitatively according to an embodiment of the present invention. Referring to FIG. 11, the method of supplying powder quantitatively comprises a preparation operation 100 of receiving quantitative supplied powder from outside and preparing transfer of the powder, a powder transfer operation 102 of transferring the powder to a chamber including the first and second space parts 48*b* and 48*g* according to a predetermined path, a compressing operation 104 of compressing the transferred powder inside the first and second space parts 48*b* and 48*g*, a separating operation 106 of separating a desired amount of the powder from the powder pressed in the second space part 48*g* using a separating means, and a discharge operation 108 of discharging the separated powder from the second space part 48*g*.

In the preparation operation 100, the powder storing case 40 receives the powder. The powder storing case 40 is disposed on the upper plate 38 and the inner circumference of the sealing ring 40*a* is tightly attached to the outer circumference of the support plane 38*a*.

In the powder transfer operation 102, the powder stored in the powder storing case 40 is transferred to the first space part 48*b* of the quantitative supply part 48 by rotating the rotor 60.

In the compressing operation 104, the powder transferred to the quantitative supply part 48 is compressed through the first and second space parts 48*b* and 48*g*. Since the main gist of the present invention transfers completely compressed powder in order to avoid an ununiform supply of quantitative powder due to a partial change in the bulk density caused by an external factor such as pressure, moisture, static electricity or the like which is applied to the power being held or transferred, using of the bridging property, the supplied quantitative powder is compressed and bridged (in the first and second space parts 48*b* and 48*g*).

The powder is compressed by the rotation of the feeding gear 48*m* and the transfer disk 52. As described with reference to FIG. 8, while the feeding gear 48*m* and the transfer disk 52 rotate using the rotational power of the second and third shafts 34 and 36, the powder is pressed into the powder pressing groove 52e by the gear teeth 48n of the feeding gear 48m.

In the separating operation 106, the desired amount of powder is separated from the compressed (lump of) powder in the second space part 48g using the blade 56b. Since the leading end part of the blade 56b enters into the powder pressing groove 52b, the blade 52b can separate the powder while the transfer disk 52 moves in the direction Y2 illustrated in FIG. 8.

In the discharge operation 108, the separated powder is discharged from the second space part 48g in the direction z3 illustrated in FIG. 9. The powder discharged from the quantitative supply part 48 is transferred to a place where it is required.

The present invention does not prevent powder from being bridged but derives bridging property in order to avoid an ununiform supply of quantitative powder due to a partial change in the bulk density of the powder caused by an external factor such as pressure, moisture, static electricity or the like which is applied to the powder being held or transferred, compresses the powder completely thereby uniforming bulk density of the transferred powder, and measures a predetermined volume of the powder by precisely separating a necessary amount of the powder from the compressed powder, thereby precisely controlling the amount of supplied powder.

While the present invention has been particularly shown and described with reference to exemplary embodiments thereof, it will be understood by those of ordinary skill in the art that various changes in form and detail may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:
1. A method of supplying powder quantitatively to a place where required, the method comprising:
   (a) transferring powder to an apparatus, said apparatus having a powder storing chamber (40) and a quantitative supply part (48), wherein the powder storing chamber (40) and the quantitative supply part (48) are connected by an opening to allow movement of powder from the powder storing case (40) to the quantitative supply part (48) and are structurally distinct from one another;
   (b) compressing powder within the quantitative supply part (48) to an extent sufficient to cause bridging in the powder;
   (c) separating a desired volumetric portion of the compressed and bridged powder, and
   (d) discharging the separated powder to the exterior of the apparatus to the place where required.
2. The method of claim 1, wherein the powder is transferred from the powder storing chamber (40) to the quantitative supply part (48) by a plurality of gears rotating at a pre determined speed ratio; and a rotor rotating by the rotational power of the gears, said rotor transferring the powder to the chamber.
3. The method of claim 1, wherein the powder is compressed in the quantitative supply part (48) using a pressing tool and a compression frame.
4. The method of claim 1, wherein, in the separating step the powder is volume-separated from the compressed powder by entering a blade in a relative motion with regard to the powder into the compressed powder in the quantitative supply part (48) to a predetermined depth.
5. The method of claim 1, wherein the apparatus further comprises:
   a driving part generating a driving force;
   a powder supply part connected to the driving part, and transferring the powder according to a predetermined path into the quantitative supply part (48); and
   a compression part compressing the transferred powder in the quantitative supply part (48).
6. The method of claim 5, wherein the driving part comprises a gear box comprising:
   a plurality of gears rotating at a pre determined speed ratio; and
   a plurality of rotation shafts fixed to the gears and rotating about their axes by the rotation of the gears, and extending in a longitudinal direction.
7. The method of claim 6, wherein the quantitative supply part (48) comprises:
   at least one feeding gear placed inside a first space part (48b) and rotated by a first of the rotation shafts, said at least one feeding gear having a plurality of gear teeth transferring the powder from the powder storing chamber (40) to the quantitative supply part (48);
   a transfer disk placed inside a second space part (48g) of the quantitative supply part (48) and rotated by a second of the rotation shafts, said transfer disk having a circular arc powder pressing groove, and receiving the compressed powder transferred through the feeding gear; and
   a cover placed on the transfer disk, partly covering the powder pressing groove, and supporting the powder to the powder pressing groove.
8. The method of claim 7, wherein the quantitative supply part (48) further comprises a blade having a leading end part entering into the powder pressing groove, said blade cutting a portion of the compressed powder in the powder pressing groove during the rotation of the transfer disk, and discharging the cut powder from the chamber.
9. The method of claim 1, wherein in the compressing step the powder is compressed by at least one feeding gear (48m) and a transfer disk (52), said feeding gear (48m) rotatably placed inside a first space part (48b) of the quantitative supply part (48) and having a plurality of gear teeth pressing and transferring the powder, and said transfer disk (52) rotatably placed inside a second space part (48g) of the quantitative supply part (48) and having a circular arc powder pressing groove (52b) that receives the compressed powder transferred through the feeding gear.
10. The method of claim 9, wherein a cover is placed on the transfer disk, said cover partly covering the powder pressing groove and supporting the powder to the powder pressing groove.
11. A method of supplying powder quantitatively to a place where required, the method comprising:
   (a) introducing a powder into a quantitative supply part (48);
   (b) compressing powder within the quantitative supply part (48) to an extent sufficient to cause bridging in the powder;
   (c) separating a desired volumetric portion of the compressed and bridged powder, and
   (d) discharging the separated powder to the exterior of the quantitative supply part to the place where required,
   wherein the quantitative supply part (48) has a first space part (48b) and second space part (48g) and wherein in the compressing step the powder is compressed by at least one feeding gear (48*m*) and a transfer disk (52), said feeding gear (48*m*) rotatably placed inside the first space part (48*b*) of the quantitative supply part (48) and having a plurality of gear teeth pressing and transferring the powder, and said transfer disk (52) rotatably placed inside the second space part (48*g*) of the quantitative supply part (48) and having a circular arc powder pressing groove (52*b*) that receives the compressed powder transferred through the feeding gear.

12. The method of claim 11, wherein a cover is placed on the transfer disk, said cover partly covering the powder pressing groove and supporting the powder to the powder pressing groove.

* * * * *